(12) United States Patent
Cross et al.

(10) Patent No.: US 7,724,434 B2
(45) Date of Patent: May 25, 2010

(54) REFLECTIVE POLARIZER AND DISPLAY DEVICE HAVING THE SAME

(75) Inventors: Elisa M. Cross, Woodbury, MN (US); Eric W. Nelson, Stillwater, MN (US); Wei Feng Zhang, Shanghai (CN); Judith M. Invie, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/496,434

(22) Filed: Jul. 1, 2009

(65) Prior Publication Data
US 2009/0262422 A1  Oct. 22, 2009

Related U.S. Application Data

(62) Division of application No. 11/383,672, filed on May 16, 2006, now Pat. No. 7,557,989.

(60) Provisional application No. 60/687,213, filed on Jun. 3, 2005.

(51) Int. Cl.
*G02B 5/30* (2006.01)
(52) U.S. Cl. ........................... 359/498; 359/497
(58) Field of Classification Search ................. 359/485, 359/497–498; 264/1.31, 1.34, 1.7
See application file for complete search history.

(56) References Cited

U.S. PATENT DOCUMENTS

| | | |
|---|---|---|
| 3,565,985 A | 2/1971 | Schrenk et al. |
| 3,801,429 A | 4/1974 | Schrenk et al. |
| 4,018,507 A | 4/1977 | Raghavan |
| 4,230,768 A | 10/1980 | Hamada et al. |
| 4,568,445 A | 2/1986 | Cates et al. |
| 4,721,377 A | 1/1988 | Fukuda et al. |
| 4,812,032 A | 3/1989 | Fukuda et al. |
| 5,162,390 A | 11/1992 | Tilley et al. |
| 5,424,339 A | 6/1995 | Zanka et al. |
| 5,540,978 A | 7/1996 | Schrenk |
| 5,691,846 A | 11/1997 | Benson, Jr. et al. |
| 5,751,388 A | 5/1998 | Larson |
| 5,825,543 A | 10/1998 | Ouderkirk et al. |
| 5,867,316 A | 2/1999 | Carlson et al. |
| 5,882,774 A | 3/1999 | Jonza et al. |

(Continued)

FOREIGN PATENT DOCUMENTS

JP  2005247949 A  9/2005

OTHER PUBLICATIONS

Fischer et al., Polymer Material Science & Engineering Symposium, ACS, Wash., D.C., Aug. 2000.

(Continued)

*Primary Examiner*—Lee Fineman
(74) *Attorney, Agent, or Firm*—Elizabeth A. Gallo

(57) ABSTRACT

A reflective polarizer suitable for use in a display device is disclosed herein. The reflective polarizer comprises: a multi-layer optical film comprising alternating layers of first and second polymeric layers that reflects light of a first polarization state and transmits light of a second polarization state, wherein for normally incident light of the second polarization state, the reflective polarizer has an internal percent transmission of at least 95% at 410 nm, and at most 25% at 380 nm. Also disclosed herein is a display device comprising the reflector polarizer.

2 Claims, 2 Drawing Sheets

U.S. PATENT DOCUMENTS

| | | |
|---|---|---|
| 6,080,467 A | 6/2000 | Weber et al. |
| 6,111,696 A | 8/2000 | Allen et al. |
| 6,224,976 B1 | 5/2001 | Takushima et al. |
| 6,355,754 B1 | 3/2002 | Olson et al. |
| 6,368,699 B1 | 4/2002 | Gilbert et al. |
| 6,449,093 B2 | 9/2002 | Hebrink et al. |
| 6,531,230 B1 * | 3/2003 | Weber et al. ............... 428/480 |
| 6,613,819 B2 | 9/2003 | Johnson et al. |
| 6,744,561 B2 * | 6/2004 | Condo et al. ............... 359/589 |
| 6,827,886 B2 | 12/2004 | Neavin et al. |
| 6,830,713 B2 * | 12/2004 | Hebrink et al. ............... 264/1.6 |
| 6,921,580 B2 | 7/2005 | Akatsu et al. |
| 6,972,813 B1 | 12/2005 | Toyooka |
| 6,974,850 B2 | 12/2005 | McMan et al. |
| 7,038,746 B2 | 5/2006 | Tominaga et al. |
| 7,106,395 B2 | 9/2006 | Maeda |
| 7,215,473 B2 | 5/2007 | Fleming |
| 7,314,652 B2 | 1/2008 | Hay et al. |
| 7,446,827 B2 | 11/2008 | Ko et al. |
| 7,511,783 B2 | 3/2009 | Toyooka |
| 7,557,989 B2 | 7/2009 | Cross et al. |
| 2004/0043234 A1 | 3/2004 | Hay et al. |
| 2004/0202879 A1 | 10/2004 | Xia et al. |
| 2004/0228141 A1 | 11/2004 | Hay et al. |
| 2004/0241469 A1 | 12/2004 | McMan et al. |
| 2005/0147838 A1 | 7/2005 | Olson et al. |
| 2006/0027321 A1 | 2/2006 | Schaffer et al. |
| 2006/0029784 A1 | 2/2006 | Doan et al. |
| 2006/0115790 A1 | 6/2006 | Alon et al. |
| 2007/0115407 A1 | 5/2007 | Richard et al. |

OTHER PUBLICATIONS

Light Absorbing Properties of Naphthalate Containing Polyesters *Letters BP*, [Online] No. 10, Jun. 2001, pp. 1-8, XP-002397975.

U.S. Appl. No. 60/687,213, "Reflective Polarizer Article and Display Device Having the Same" by Cross et al., filed Jun. 3, 2005.

* cited by examiner

REFLECTIVE POLARIZER AND DISPLAY DEVICE HAVING THE SAME

CROSS REFERENCE TO RELATED APPLICATIONS

This application is a divisional of U.S. patent application Ser. No. 11/383,672, filed on May 16, 2006, now U.S. Pat. No. 7,557,989, which claims the benefit of Provisional Application No. 60/687,213, filed on Jun. 3, 2005.

FIELD OF THE INVENTION

The invention relates to a reflective polarizer that is useful in display devices, particularly those that are direct-lit and operate under high brightness and temperature conditions.

BACKGROUND

Recent years have seen tremendous growth in the number and variety of display devices available to the public. Computers (whether desktop, laptop, or notebook), personal digital assistants, mobile phones, and televisions having liquid crystal displays (LCD TVs) are but a few examples. Although some of these display devices are reflective display devices that utilize ordinary ambient light to view the display panel, most are transmissive display devices that require a light source to make the display panel visible.

Transmissive display devices fall into the categories of "edge-lit" or "direct-lit". These categories differ in the placement of the light source relative to the display panel which defines the viewable area of the display device. In edge-lit display devices, a light source is disposed along an outer border of the display device, outside of the viewable area. The light source typically emits light into a light guide, a clear polymeric slab having length and width dimensions on the order of the viewable area, and from which light is extracted for illumination of the viewable area. In direct-lit display devices, a light source is disposed behind the viewable area, such that light emitted by the light source directly illuminates the viewable area. Some direct lit backlights also incorporate an edge-mounted light, and are thus capable of both direct lit and edge lit operation.

SUMMARY

Disclosed herein is a reflective polarizer suitable for use in a display device. The reflective polarizer comprises a multilayer optical film comprising alternating layers of first and second polymeric layers, the first and second polymeric layers having refractive indices along an in-plane x-axis that differ sufficiently to substantially reflect light of a first polarization state, the first and second polymeric layers having refractive indices along an in-plane y-axis that are matched sufficiently to substantially transmit light of a second polarization state, wherein the x- and y-axes are orthogonal, wherein at least one of the first and second polymeric layers comprises naphthalate functionality; first and second support layers disposed on opposite sides of the multilayer optical film and adhered thereto by first and second adhesive layers, respectively, the first and second support layers being light transmissive; wherein at least one of the first and second polymeric layers, the first and second support layers, and the first and second adhesive layers comprises a UV absorber that absorbs UV light and transmits visible light, such that for normally incident light of the second polarization state, the reflective polarizer has an internal percent transmission of at least 95% at 410 nm, and at most 25% at 380 nm.

Also disclosed herein is a display device comprising a display panel, a light source, and the reflective polarizer described above, wherein the reflective polarizer is disposed between the display panel and the light source.

These and other aspects will be apparent from the detailed description below. In no event, however, should the above summaries be construed as limitations on the claimed subject matter, which subject matter is defined solely by the attached claims, as may be amended during prosecution.

DETAILED DESCRIPTION

Figure 1:
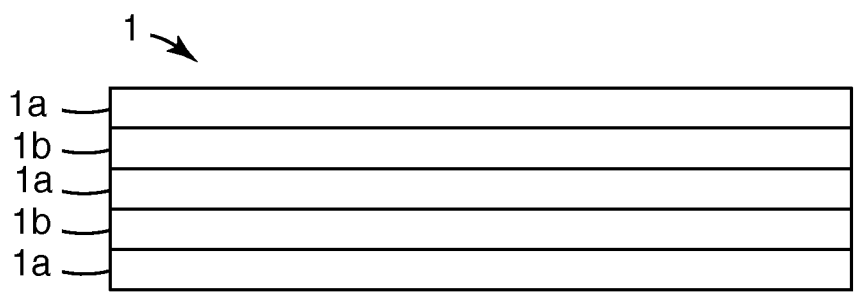
FIGS. 1, 2A and 2B show exemplary multilayer optical films.

The operating environments inside of LCD TVs are becoming significantly more harsh as compared to other display devices. For one, an LCD TV is a direct-lit display device, and so does not benefit from the UV absorbing capacity of a light guide present in an edge-lit device. As such, the cavity of an LCD TV is bombarded with harmful UV radiation from the light source, and any component inside the cavity that absorbs UV radiation is subject to degradation. LCD TVs are also expected to have much higher brightness and much longer product lifetimes as compared to other direct-lit display devices, and to meet these demands, light sources having very high intensities are being used. As a result, the temperature inside of an LCD TV may reach up to 65-85° C., as compared to 30-45° C. for most other display devices. In addition, high intensity light sources that are being manufactured for LCD TVs have a significant peak in the UV region, particularly at 365 nm, and UV-absorbing coatings on the light sources are being eliminated by manufacturers, typically for reasons related to cost.

Multilayer optical films such as reflective polarizers are used in display devices such as LCD TVs. Multilayer optical films typically comprise alternating polymeric layers wherein the polymers are derived from components having naphthalate functionality; examples include polyethylene naphthalate (PEN) and copolymers or blends based upon naphthalene dicarboxylic acid (co-PEN). The presence of naphthalate functionality causes a reflective polarizer to degrade rapidly under the harsh operating conditions described above, as evidenced by increasing yellowness over time. UV radiation of 360-400 nm may be especially damaging given the absorption spectrum of the PEN-containing polymers. This radiation will be transmitted by typical polymers, such as acrylates, styrenes or polycarbonates used in diffuser plates, but will be absorbed by PEN, causing degradation.

It is thus desirable to prevent degradation of PEN-containing multilayer optical films. One solution is to incorporate one or more UV absorbers into the multilayer optical film. It is difficult, however, to implement this solution because the presence of most UV absorbers can impart undesirable yellowness at the display panel of the display device.

In general, it is difficult to find UV absorbers that work well in a particular application, especially if minor differences in UV absorption have detrimental effects on performance. Ideally, one should be able to pick and choose from a variety of UV absorbers, each having a sharp absorption cutoff on the long wavelength side, but UV absorbers having these properties do not exist, hence the large number of commercially available UV absorbers.

It has been found that if a UV absorber is present in the reflective polarizer such that it has particular absorption properties, its degradation can be reduced with little or no additional yellowness. The particular properties pertain to the internal percent transmission (% T) of a film at two different wavelengths. Internal percent transmission is the intrinsic transmission of the film, i.e., it does not take into account any surface reflections. (In general, a film can have an internal percent transmission up to 100%, and if surface reflections are taken into account, the total transmission can be up to about 92%.)

In particular, it is desirable that the reflective polarizer exhibit as little internal percent transmission at 380 nm as possible, for example, at most 25%, or at most 15%. This helps to filter out UV radiation from high intensity light sources that are newly available for use in LCD TVs. Also, in particular, the reflective polarizer desirably exhibits as much internal percent transmission at 410 nm as possible, for example, at least 95%, so that it does not cause yellowness at the display panel. Thus, the UV absorber present in the reflective polarizer must have a high extinction coefficient at 380 nm and a sharp cut-off on the long wavelength side.

The UV absorber may comprise a benzotriazole, benzatriazine, benzophenone, or a combination thereof; or it may be any of those described in U.S. 2004/0241469 A1; U.S. 2004/0242735 A1; and U.S. Pat. No. 6,613,819 B2; all incorporated herein by reference for all that they contain. Particular examples include CGL 139, CGL 777, and Tinuvin® 327, 460, 479, 480, 777, 900, and 928; all from Ciba Specialty Chemicals. The UV absorber may also comprise a combination of UV absorbers, for example, CGL 479 in combination with CGL 777.

The amount of the UV absorber used in the reflective polarizer depends on a variety of factors such as its extinction coefficient, the amount of naphthalate functionality in the reflective polarizer, and the spectrum of light emitted by the light sources. The amount used may also depend on the thickness of the layer into which the UV absorber is incorporated. In particular, for a layer having a thickness of 178 um (7 mil), 2 wt. % CGL-139 gives 23% T at 380 nm, and 95.0% T at 410 nm. For a layer having a thickness of 178 um (7 mil), 3 wt. % Tinuvin 327 and 1 wt. % CGL-139 give 4.5% T at 380 nm, and 95.9% T at 410 nm.

Degradation of the naphthalate-containing reflective polarizer can be determined by measuring the change in yellowness, or $\Delta b^*$, as is known in the CIE L*a*b* color space, developed by the Commission Internationale de l'Eclairage in 1976. A widely used method for measuring and ordering color, CIE L*a*b* color space is a three-dimensional space in which a color is defined as a location in the space using the terms L*, a*, and b*. L* is a measure of the lightness of a color and ranges from zero (black) to 100 (white) and may be visualized as the z-axis of a typical three-dimensional plot having x-, y- and z-axes. The terms a* and b* define the hue and chroma of a color and may be visualized as the x- and y-axes, respectively. The term a* ranges from a negative number (green) to a positive number (red), and the term b* ranges from a negative number (blue) to a positive number (yellow). Thus, b*, as used herein, relates to the yellowness of an article. For a complete description of color measurement, see "Measuring Color", 2nd Edition by R. W. G. Hunt, published by Ellis Horwood Ltd., 1991. In general, b* for the brightness enhancing film is about 2.5 or less, otherwise it appears too yellow.

The amount of UV absorber used in the reflective polarizer may also depend on desired performance criteria. For LCD TVs, it has been found that the naphthalate-containing reflective polarizer should exhibit $\Delta b^*$ of at most 4, preferably less than 2.5, after exposure to irradiation at 380 nm at an intensity 5 to 10 mW/cm$^2$ for 200 hours and 65° C. In some applications, it is especially desirable that $\Delta b^*$ be less than about 1 after 12 days.

Reflective Polarizers

Disclosed herein is a reflective polarizer suitable for use in a display device. In general, reflective polarizers rely on the difference between refractive indices of at least two layers, usually polymeric layers, to reflect light of a first polarization state and transmit light of a second polarization state orthogonal to the first polarization state. "Orthogonal" in this regard simply means a state that is complementary to the other state, and is not limited to a 90 degree linear geometry. The reflective polarizer can be or comprise, for example, any of the dual brightness enhancement film (DBEF) products or any of the diffusely reflective polarizing film (DRPF) products available from 3M Company under the Vikuiti™ brand. For a detailed description of the materials, properties, manufacturing, and use of reflective polarizers, see for example, U.S. Pat. No. 5,882,774; U.S. Pat. No. 6,080,467; U.S. Pat. No. 6,368,699 B1; U.S. Pat. No. 6,827,886 B2; U.S. 2005/0024558 A1; U.S. Pat. No. 5,825,543; U.S. Pat. No. 5,867,316; or U.S. Pat. No. 5,751,388; or U.S. Pat. No. 5,540,978; the disclosures of which are incorporated herein by reference for all that they contain.

FIG. 1 shows a schematic cross-section of an exemplary reflective polarizer 1 comprising first polymeric layer 1a and second polymeric layer 1b. At least one of the first and second polymeric layers comprises naphthalate functionality, incorporated into the first and second polymeric layers by polymerizing one or more monomers comprising naphthalate functionality. Examples of such monomers include naphthalates such as 2,6-, 1,4-, 1,5-, 2,7 and 2,3-naphthalene dicarboxylic acid, and esters thereof. Monomers comprising naphthalate functionality may be used to form polyesters by polymerizing the monomers with diols such as alkane glycols and cycloalkane glycols. In one embodiment, at least one of the first and second polymeric layers comprises poly(ethylene) naphthalate (PEN), which is a copolymer of 2,6-, 1,4-, 1,5-, 2,7-, and/or 2,3-naphthalene dicarboxylic acid and ethylene glycol.

In another embodiment, the first polymeric layer may comprise poly(ethylene) naphthalate, and the second polymer layer may comprise naphthalate and terephthalate functionality. Monomers suitable for introducing terephthalate functionality are terephthalic acid and esters thereof. In another embodiment, the first polymeric layer may comprise poly(ethylene) naphthalate, and the second polymer layer may be a copolymer of 2,6-, 1,4-, 1,5-, 2,7-, or 2,3-naphthalene dicarboxylic acid; terephthalic acid; and ethylene glycol. This copolymer is often referred to as coPEN.

Examples of combinations of first and second polymer layers include PEN/coPEN, polyethylene terephthalate (PET)/coPEN, PEN/sPS, PET/sPS, PEN/Estar, PET/Estar, PET/Ecdel, PEN/Ecdel, PEN/THV, and PEN/coPET. Estar is polycyclohexanedimethylene terephthalate (from Eastman Chemical Co.); Ecdel is a thermoplastic polyester (from Eastman Chemical Co.); THV is a fluoropolymer (from 3M Co.) "coPET" refers to a copolymer or blend based upon terephthalic acid.

Figure 2A:
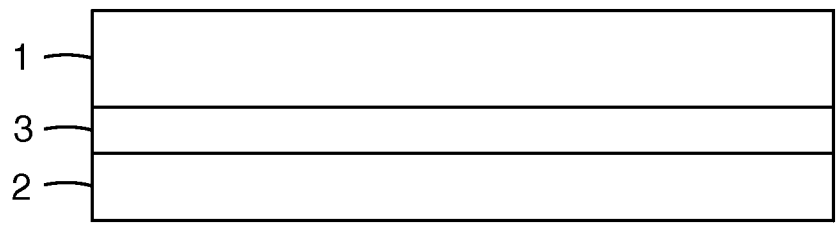
Figure 2B:
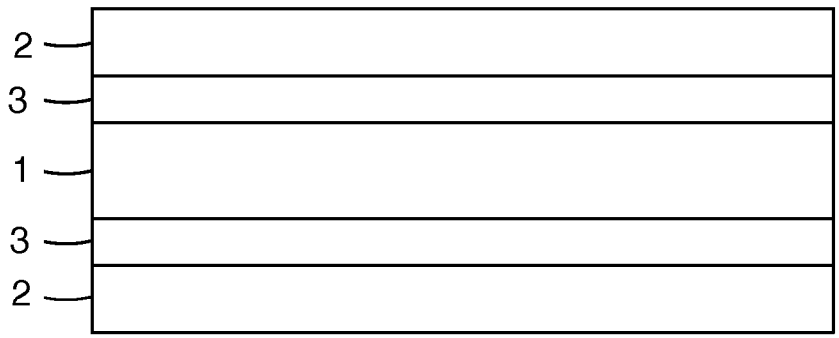

FIG. 2a shows a schematic cross-section of an exemplary reflective polarizer 2a having support layer 2 disposed on one side of the multilayer optical film 1, and FIG. 2b shows support layer 2 disposed on both sides thereof. In either case, the support layer(s) may be extruded or coated onto the multilayer optical film 1 in a separate coating operation, or they may be laminated to the multilayer optical film as a separate film, foil, semi-rigid or rigid substrate. Examples of useful support layers include polycarbonate, polyester, acrylic, metal, or glass. In one embodiment, the support layer(s) comprise polycarbonate or polyester.

An additional layer(s) 3, as shown in FIGS. 2a and 2b, is optional and may be an adhesive layer used to adhere the support layer 2 to the multilayer optical film 1. Useful adhesives include those that are optically clear or diffuse and may or may not be pressure sensitive adhesives. The adhesives may be curable using UV or visible radiation. One type of suitable adhesive comprises the reaction product of at least one nitrogen-containing polymer and at least one polymerizable ethylenically unsaturated diluent. Examples of such adhesives are described in U.S. 2004/0202879; U.S. 2006/027321 A1 and U.S. 2006/029784 A1, the disclosures of which are incorporated herein by reference. Adhesives having the following materials are useful:

Ageflex™ PEA (from CIBA)=phenoxy ethyl acrylate
Luviskol Plus™ (from BASF)=homopolymer of vinylcaprolactam
Sartomer CD9038=ethoxylated Bisphenol A diacrylate
Lucrin TPO (from BASF)=diphenyl(2,4,6-trimethylbenzoyl)phosphine oxide
Irganox® 1010 (from CIBA)=hindered phenol
Etermer™ 210 (from Eternal Chemical)=phenoxy ethyl acrylate
PVP/VA E-335 (from International Specialty Products) =linear, random copolymer of vinylpyrrolidone and vinyl acetate (at 30/70 molar ratio)
Ebecryl® E-270 (from UCB Radcure)=aliphatic urethane diacrylate
Sartomer SR-339=phenoxy ethyl acrylate
Sartomer CD611=alkoxylated THF acrylate
Aquazol™ 50 (from International Specialty Products)=homopolymer of ethyloxazoline
SIMD=copolymer of stearyl methacrylate/isobutyl methacrylate/methyl methacrylate/dimethylaminoethyl methacrylate at 10/20/20/50 wt. ratio In particular, Adhesive Compositions 1-6 described in U.S. 2006/029784 A1 are suitable:

Adhesive 1: Ageflex™ PEA/Luviskol Plus™/Sartomer CD9038/Lucrin TPO=80/10/10/1.0 wt. ratio
Adhesive 2: Ageflex™ PEA/Luviskol Plus™/Sartomer CD9038/Lucrin TPO/Irganox® 1010=80/10/10/1.0/0.5 wt. ratio
Adhesive 3: Etermer™ 210/E-335/Sartomer CD9038/Lucrin TPO/Irganox® 1010=75/15/10/1.0/0.5 wt. ratio
Adhesive 4: Ageflex™ PEA/E-335/Sartomer CD9038/Lucrin TPO=75/15/10/1.0 wt. ratio
Adhesive 5: Sartomer SR339/Aquazol™ 50/Sartomer CD611/Ebecryl® E-270/Sartomer CD9038/Lucrin TPO=65/10/15/5/5/1 wt. ratio
Adhesive 6: Sartomer SR339/SIMD/Sartomer CD611/Ebecryl® E-270/Sartomer CD9038/Lucrin TPO=60/15/15/5/5/1 wt. ratio The multilayer optical film 1 may have a skin layer on one or both sides thereof in order to protect it from high shearing forces during the extrusion process.

An outer layer may be disposed on each of the outer surfaces of the support layers 2. The outer layer may be coated on the support using a variety of coating compositions in combination with conventional coating techniques. Suitable coating compositions may comprise solvent, thermoplastic polymers, binders, particles, pre-polymer components that are cured, surfactants, etc. The outer layer may also be laminated onto the support layer.

In general, the UV absorber may be present in at least any one of the layers of the reflective polarizer, and the particular layer or layers depends on many factors such as the identity of the UV absorber (or combination thereof), the amount of naphthalate functionality present, layer thicknesses, etc. As described below, the layer or layers in which the UV absorber is present may also depend on the particular display device.

Thus, disclosed herein is a reflective polarizer suitable for use in a display device, the reflective polarizer comprising: a multilayer optical film comprising alternating layers of first and second polymeric layers, the first and second polymeric layers having refractive indices along an in-plane x-axis that differ sufficiently to substantially reflect light of a first polarization state, the first and second polymeric layers having refractive indices along an in-plane y-axis that are matched sufficiently to substantially transmit light of a second polarization state, wherein the x- and y-axes are orthogonal, wherein at least one of the first and second polymeric layers comprises naphthalate functionality; first and second support layers disposed on opposite sides of the multilayer optical film and adhered thereto by a first and second adhesive layer, respectively, the first and second support layers being light transmissive; wherein at least one of the first and second polymeric layers, the first and second support layers, and the first and second adhesive layers comprises a UV absorber that absorbs UV light and transmits visible light, such that for normally incident light of the second polarization state, the reflective polarizer has an internal percent transmission of at least 95% at 410 nm, and at most 25% at 380 nm.

In particular, at least one of the first and second polymeric layers may comprise the UV absorber, and the UV absorber is not present in the first and second support layers or the first and second adhesive layers. Alternatively, at least one of the first and second support layers may comprise the UV absorber, and the UV absorber is not present in the first and second polymeric layers or the first and second adhesive layers. Another option is for at least one of the first and second adhesive layers to comprise the UV absorber, and the UV absorber is not present in the first and second polymeric layers or the first and second support layers. Still yet another option is for at least one of the first support layer and the first adhesive layer to comprise the UV absorber, and the UV absorber is not present in the first and second polymeric layers, the second support layer, or the second adhesive layer. The four layers other than the first and second polymeric layers may comprise the UV absorber. If present, one or both of the skin layers may comprise the UV absorber. If present, one or both of the outer layers coated on the support layers may comprise the UV absorber.

Many support layers such as polycarbonate or polyester commonly have UV absorbers added. Polycarbonate almost always comprises bis-phenol A units, and the UV absorbers typically employed absorb at the same lambda max which is around 320 nm. A standard UV absorber such as Tinuvin® 429 would effectively protect a polycarbonate or polyester support layer. However, UV absorbers with longer wavelength absorptions necessary to protect a multilayer optical film with naphthalate functionality are not typically employed.

If the UV absorber is present in two or more layers of the reflective polarizer, then any distribution of the amount may be the same in each layer or it may be different. For example, if used in the first and second support layers, the UV absorber may be present in a substantially equal amount. Likewise, if used in the first and second adhesive layers, the UV absorber may be present in a substantially equal amount. If used in the first support layer and the first adhesive layer, the UV absorber may be present in a substantially equal amount.

The reflective polarizers disclosed thusfar pertain to symmetrical constructions, i.e., layers on both sides of the multilayer optical film are the same. Asymmetrical constructions may also be useful. For example, the reflective polarizer may comprise the first support layer and the first adhesive layer, but not the second support layer or the second adhesive layer. In this case, the UV absorber may be present in at least one of the first support layer and the first adhesive layer. This reflective polarizer would be positioned such that the side having the UV absorber were facing the light source. Harmful UV radiation would then be removed and little, if any, transmitted through to the multilayer optical film. In addition, making the construction assymetric would also allow constructions in which the substrate facing the lamps is birefringent. Birefringent substrates are not allowed between the reflective polarizer and the LCD panel, but could reduce cost when used on the lamp side of the laminate.

The reflective polarizer may comprise one or more of the additional coatings and layers as described in U.S. Pat. No. 6,368,699 B1; and the UV absorber may be incorporated into any one of them.

Display Devices

Figure 3:
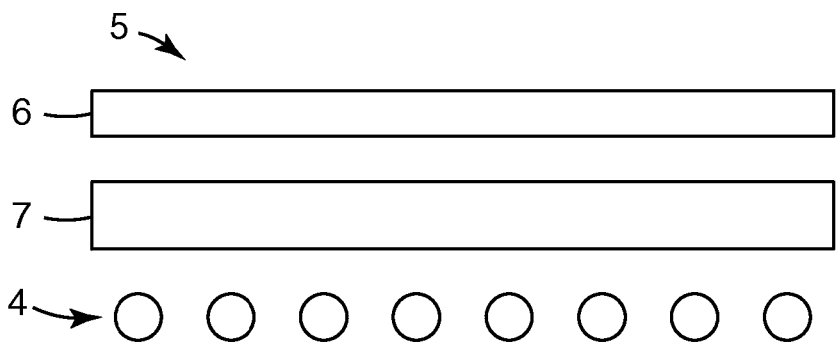
FIG. 3 shows a direct-lit display device.

Also disclosed herein is a display device comprising the reflective polarizers disclosed herein. As shown in FIG. 3, display device 5 comprises display panel 6; light source 4; and reflective polarizer 7 disposed between the display panel and the light source; wherein the light source illuminates the display panel through the reflective polarizer. The display panel may be a liquid crystal display panel. The display device may be a television. The light sources may be fluorescent light sources.

For a detailed description of the design, applications, materials, properties, manufacturing, use, etc. of display devices, see for example: U.S. Ser. No. 10/966,610; U.S. Ser. No. 11/283,307; U.S. Ser. No. 10/747,985; U.S. Pat. No. 6,744,561 B2; U.S. 2004/0228141; U.S. 2004/0241469 A1; U.S. Pat. No. 6,974,850 B2; U.S. Pat. No. 6,111,696; U.S. Pat. No. 6,613,819 B2; U.S. Pat. Nos. 4,568,445; 4,721,377; 4,812,032; 5,424,339; and U.S. Pat. No. 6,355,754; all incorporated herein by reference for all that they contain.

EXAMPLES

Example A

A naphthalate-containing multilayer optical film was prepared as described in U.S. Pat. No. 6,368,699 B1. A coextruded film containing 601 layers was made on a sequential flat-film-making line via a coextrusion process. PEN with an Intrinsic Viscosity of 0.57 dl/g (as measured in a solution of 60 wt. % phenol/40 wt. % dichlorobenzene) was delivered by extruder A at a rate of 52 kg/h (114 pounds per hour) with 29 kg/h (64 pounds per hour) going to the feedblock and the rest going to skin layers described below. Polymethyl methacrylate (PMMA; CP-82 from ICI of Americas) was delivered by extruder B at a rate of 28 pounds per hour with all of it going to the feedblock. PEN was in the skin layers of the feedblock. The feedblock method was used to generate 151 layers using the feedblock such as those described in U.S. Pat. No. 3,801,429, after the feedblock two symmetric skin layers were coextruded using extruder C metering about 14 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another device that coextruded skin layers at a total rate of 25 pounds per hour of PEN from extruder A. The web was length oriented to a draw ratio of about 3.2 with the web temperature at about 138° C. (280° F.). The film was subsequently preheated to about 154° C. (310° F.) in about 38 seconds and drawn in the transverse direction to a draw ratio of about 4.5 at a rate of about 11 percent per second. The film was then heat-set at 227° C. (440° F.) with no relaxation allowed. The finished film thickness was about 75 um (3 mil).

Coating compositions were prepared by combining different UV absorbers with 10.56 wt. % aliphatic urethane acrylate oligomer (Photomer® 6010 from SpecialChem S.A.), 4.62 wt. % ethoxylated trimethylol propane triacrylate (Sartomer 454 from Sartomer Co.), 11.22 wt. % neopentane glycol diacrylate (SR 9003 from Sartomer Co.), 0.30 wt. % light stabilizer (Tinuvin® 123 from Ciba Specialty Chemicals), and 0.30 wt. % photoinitiator (Irgacure® 819 from Ciba Specialty Chemicals). The UV absorbers and respective amounts used in each of the multilayer optical films are summarized in Table 1.

Each coating composition was applied to the film described above, by dissolving the coating composition in ethyl acetate to form a coating solution containing 40 wt. % solids. The coating compositions were applied using a Meyer bar, dried in an oven for 1 min. at 100° C., and cured in-line using a 25 cm/s (50 ft/min) line speed at coating thicknesses ranging from 6 to 35 um in an inert atmosphere having an oxygen concentration below 100 ppm. UV photocuring energy was supplied using a high intensity FUSION D-bulb powered with 236 Joules/sec-cm input power.

TABLE 1

| Example | UV Absorber | Wt. % of UV Absorber |
|---|---|---|
| 1 | CGL 777 | 8 |
|   | CGL 479 | 4 |
| 2 | CGL 777 | 6 |
| 3 | Tinuvin ® 327 | 10 |
| 4 | CGL 139 | 6 |
| Comparative 1 | CGL 928 | 6 |
| Comparative 2 | CGL 479 | 6 |
| Comparative 3 | Tinuvin ® 405 | 6 |
| Control | none | 0 |

Figure 4:
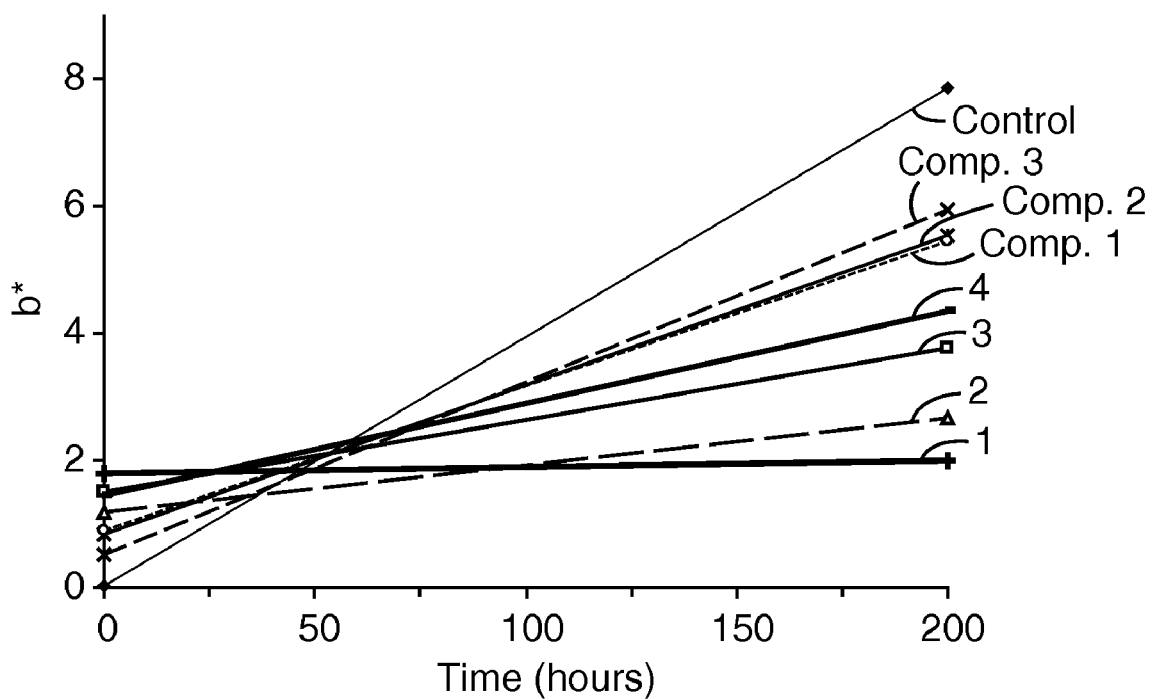
FIGS. 4 and 5 show data obtained from testing described in the Examples.
Figure 5:
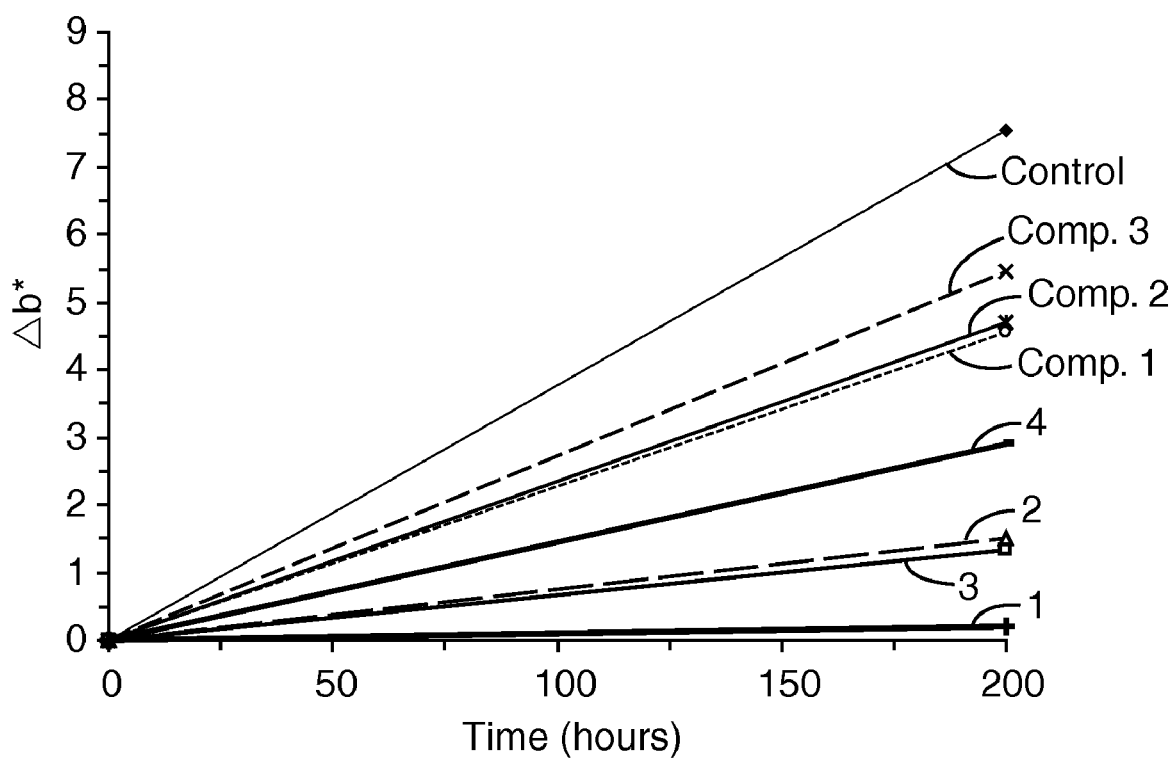

Each of the films described above were evaluated by subjecting the films to 200 hours of UV radiation at 380 nm, intensity 5 to 10 mW/cm$^2$, and temperature 65° C. The b* coordinates were measured both before and after application of the UV radiation, and the results are summarized in Table 2 and FIGS. 4 and 5. A maximum of 5 is acceptable for b*$_f$, and a maximum of 3 is acceptable for Δb*.

TABLE 2

| Example | % T at 380 nm | % T at 410 nm | b*$_I$ (0 hrs.) | b*$_f$ (200 hrs.) | Δb* |
|---|---|---|---|---|---|
| 1 | 9.2 | 99.5 | 1.8 | 2.0 | 0.2 |
| 2 | 18.8 | 99.7 | 1.2 | 2.7 | 1.5 |
| 3 | 14.0 | 98.7 | 1.5 | 3.8 | 1.3 |
| 4 | 21.2 | 94.8 | 1.4 | 4.3 | 2.9 |
| Comparative 1 | 49.5 | 100 | 0.9 | 5.5 | 4.6 |
| Comparative 2 | 89.5 | 100 | 0.8 | 5.5 | 4.7 |
| Comparative 3 | 93.6 | 100 | 0.5 | 6.0 | 5.4 |
| Control 1 | 100 | 100 | 0.03 | 7.9 | 7.5 |

The above data show that if % T at 380 is less than about 25, then b*$_f$ is less than about 4.5, and Δb* is less than about 3.

The multilayer optical film used in this example was a mirror film which is expected to show the general concept of protecting naphthalate-containing reflective polarizers. Reflective polarizers and mirrors would be expected to show similar weathering behavior.

Example B

A UV-curable adhesive (Adhesive Composition 1 of U.S. 2006/029784 A1) was prepared and compounded with the UV absorbers listed in Table 3 and 1 wt. % of a hindered amine light stabilizer (Tinuvin® 123 from Ciba Specialty Chemicals). The UV-curable adhesive was 100% solids, substantially free of solvent, and comprised the following components:
- phenoxy ethyl acrylate (Ageflex PEA from CIBA) at 80 wt. %;
- homopolymer of vinylcaprolactam (Luviskol Plus from BASF) at 10 wt. %;
- ethoxylated Bisphenol A diacrylate (Sartomer CD9038) at 10 wt. %; and
- diphenyl(2,4,6-trimethylbenzoyl)phosphine oxide (Lucirin TPO from BASF) at 1 wt. %.

The adhesive comprising the UV absorber and stabilizer was then used to laminate a reflective polarizer (described in U.S. Pat. No. 6,972,813 B1) between two sheets of support layers comprising 127 um (5 mil) polycarbonate. The adhesive thickness was approximately 10 um on each side of the reflective polarizer. UV photocuring energy was supplied, using a high intensity FUSION D-bulb powered with 236 Joules/sec-cm input power, in order to cure the adhesive.

TABLE 3

| Example | UV Absorber | Wt. % of UV Absorber |
|---|---|---|
| 5 | CGL 139 | 0.5 |
| 6 | CGL 139 | 1 |
| 7 | CGL 139 | 2 |
| Control 2 | none | 0 |
| 8 | Tinuvin ® 327 | 1 |
|   | CGL 139 | 0.5 |
| Control 3 | none | 0 |

Each of the laminated articles described above were tested using a QUVcw light exposure apparatus equipped with Phillips F40 50 U bulbs, which have an emission spectrum similar to the cold cathode fluorescent lamps found in typical LCD-TVs. The intensity of the emission was adjusted to be 0.5 W/m$^2$ at 448 nm, which resulted in a UV intensity of 1.71 W/m$^2$ integrated over 340-400 nm. The chamber temperature during the exposure was 83° C. and the length of the exposure was 12 days.

The b* coordinates were measured both before and after exposure and the results are shown in Table 4. For Examples 7 and 8, Beer's law was used to calculate internal percent transmission values for 7 um thick adhesive layers, after measuring molar absorption coefficients for the UV absorbers.

TABLE 4

| Example | % T at 380 nm | % T at 410 nm | b*$_i$ (0 hrs.) | b*$_f$ (12 days) | Δb* |
|---|---|---|---|---|---|
| 5 | ND | ND | 2.75 | 3.48 | 0.73 |
| 6 | ND | ND | 3.08 | 3.78 | 0.69 |
| 7 | 22 | 95 | 2.62 | 3.21 | 0.59 |
| Control 2[1] | ND | ND | 2.05 | 3.10 | 1.05 |
| 8 | 31 | 98 | 2.21 | 3.02 | 0.82 |
| Control 3[2] | ND | ND | 1.82 | 3.73 | 1.91 |

ND = not determined
[1]Control 2 was tested with Examples 5-7
[2]Control 3 was tested with Example 8

Various modifications and alterations of this invention will be apparent to those skilled in the art without departing from the scope and spirit of this invention, and it should be understood that this invention is not limited to the illustrative embodiments set forth herein. All U.S. patents, patent application publications, and other patent and non-patent documents referred to herein are incorporated by reference for all that they contain, to the extent they are not inconsistent with the foregoing disclosure.

What is claimed is:

1. A reflective polarizer suitable for use in a display device, the reflective polarizer comprising:
    a multilayer optical film comprising alternating layers of first and second polymeric layers, the first and second polymeric layers having refractive indices along an in-plane x-axis that differ sufficiently to substantially reflect light of a first polarization state, the first and second polymeric layers having refractive indices along an in-plane y-axis that are matched sufficiently to substantially transmit light of a second polarization state, wherein the x- and y-axes are orthogonal, wherein at least one of the first and second polymeric layers comprises naphthalate functionality; and
    first and second skin layers disposed on opposite sides of the multilayer optical film;
    wherein at least one of the first and second polymeric layers and the first and second skin layers comprises an ultraviolet (UV) absorber that absorbs UV light and transmits visible light, such that for normally incident light of the second polarization state, the reflective polarizer has an internal percent transmission of at least 95% at 410 nm, and at most 25% at 380 nm.

2. The reflective polarizer of claim 1, wherein at least one of the first and second skin layers comprises the UV absorber.

* * * * *